(12) United States Patent
Yuan

(10) Patent No.: US 6,887,408 B2
(45) Date of Patent: May 3, 2005

(54) POROUS POLY(ARYL ETHER KETONE) MEMBRANES, PROCESSES FOR THEIR PREPARATION AND USE THEREOF

(75) Inventor: Youxin Yuan, Syracuse, NY (US)

(73) Assignee: PoroGen LLC, Wilmington, MA (US)

( * ) Notice: Subject to any disclaimer, the term of this patent is extended or adjusted under 35 U.S.C. 154(b) by 0 days.

(21) Appl. No.: 10/836,043

(22) Filed: Apr. 30, 2004

(65) Prior Publication Data

US 2004/0222169 A1 Nov. 11, 2004

Related U.S. Application Data

(60) Provisional application No. 60/468,013, filed on May 5, 2003.

(51) Int. Cl.$^7$ .............................................. B01D 71/06
(52) U.S. Cl. ......................... 264/49; 264/514; 264/561; 264/562; 264/567; 264/177.18; 264/346; 210/500.22; 210/500.23; 210/500.27; 210/500.39; 528/310; 521/64
(58) Field of Search .......................... 264/41, 45.9, 49, 264/514, 151, 557, 561, 562, 567, 46.3, 346, 288.8, 289.3, 177.18, 209.5; 210/500.22, 500.23, 500.27, 500.39; 528/310; 521/62, 64

(56) References Cited

U.S. PATENT DOCUMENTS

| | | | |
|---|---|---|---|
| 4,721,732 A | 1/1988 | Dubrow et al. | 521/62 |
| 4,957,817 A | 9/1990 | Chau et al. | 428/436 |
| 4,992,485 A | 2/1991 | Koo et al. | 521/180 |
| 5,064,580 A | 11/1991 | Beck et al. | 264/28 |
| 5,089,192 A | 2/1992 | Costa | 264/49 |
| 5,200,078 A | 4/1993 | Beck et al. | 210/500.23 |
| 5,205,968 A | 4/1993 | Damrow et al. | 264/28 |
| 5,227,101 A | 7/1993 | Mahoney et al. | 264/28 |
| 5,651,931 A | 7/1997 | Bailey et al. | 264/126 |
| 5,997,741 A | 12/1999 | Shimoda et al. | 210/500.27 |
| 6,017,455 A | 1/2000 | Shimoda et al. | 210/500.23 |
| 2002/0113006 A1 * | 8/2002 | Sale et al. | 210/490 |

FOREIGN PATENT DOCUMENTS

EP 0 737 506 A1 10/1996

OTHER PUBLICATIONS

Mark. F. Sonnenschein, Hollow Fiber Microfiltration Membranes from Poly(ether ether ketone) (PEEK), Journal of Applied Polymer Science. vol. 72. pp. 175–181, 1999.

Rakeshh. Mehta, et al., Microporour membranes based on poly (ether ether ketone) via thermally–induced phase separation, Journal of Membrane Science 107 (1195) pp. 95–106, 1995 Elsevier Science B.V.

Matsumoto Yasuyo; others:04, Porus Polyetherethereketone Film and its Preparation, Dec. 4, 1991, pp. 1+311–315.

Yong Ding et al., Novel Macro and Meso Porous Material Prepared from Miscible Polysulfone/Polyimide Blends,2003 Materials Prepared from Miscible Polysulfone/Poly, Mat.Res.Soc.Symp.Proc.vol. 752 c 2003 Materials Research Society , pp. 8–15.

* cited by examiner

Primary Examiner—Gregory Mills
Assistant Examiner—K S Menon
(74) Attorney, Agent, or Firm—St. Onge Steward Johnston & Reens LLC

(57) ABSTRACT

Porous poly(aryl ether ketone) (PAEK) articles are prepared from PAEK/polyimide blends by selective chemical decomposition and subsequent removal of the polyimide phase. Porous PAEK articles exhibit highly interconnected pore structure and a narrow pore size distribution. The porous PAEK articles of the present invention can be utilized as a porous media for a broad range of applications, including membranes for fluid separations, such as microfiltration, ultrafiltration, nanofiltration, and as a sorption media.

30 Claims, 3 Drawing Sheets

POROUS POLY(ARYL ETHER KETONE) MEMBRANES, PROCESSES FOR THEIR PREPARATION AND USE THEREOF

CROSS-REFERENCE TO RELATED APPLICATIONS

This application claims the benefit of, under 35 U.S.C. §119(e), U.S. Provisional Patent Application No. 60/468,013, filed May 5, 2003.

FIELD OF THE INVENTION

The present invention relates to a process for the preparation of porous articles of poly(aryl ether ketone) (herein after referred to as PAEK). More particularly, the present invention relates to preparation of porous PAEK articles from PAEK/polyimide blends by a melt extrusion process followed by the removal of the polyimide phase. Porous PAEK articles exhibit uniform pore size distribution and can be used as a porous media for a broad range of applications, including porous membranes for fluid separations, such as microfiltration, nanofiltration, and ultrafiltration, and as a sorption media.

BACKGROUND OF THE INVENTION

Microporous polymeric membranes are well known in the art and are used widely for filtration and purification processes, such as filtration of waste water, preparation of ultrapure water and in medical, pharmaceutical or food applications, including removal of microorganisms, dialyses and protein filtration. While these membranes have found broad utility for a variety of purposes, they suffer from several disadvantages, such as broad and frequently non uniform pore size distribution, and limited chemical, solvent and thermal resistance.

Poly(aryl ether ketone)s represent a class of semi-crystalline engineering thermal plastics with outstanding thermal properties and chemical resistance. One of the representative polymers in this class is poly(ether ether ketone), PEEK, which has a reported continuous service temperature of approximately 250° C. PAEK polymers are virtually insoluble in all common solvents at room temperature. These properties make PAEK attractive materials for porous membrane preparation. However, the application of PAEK polymers in membrane fabrication has been limited owing to their intractability, which prevents the use of conventional solvent-based methods of membrane casting.

It is known in the art to prepare porous PEEK membranes from solutions of strong acids, such as concentrated sulfuric acid. PEEK can undergo sulfonation in the concentrated sulfuric acid media and thus lose some of its desirable sought after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is highly complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a subambient temperature, followed by coagulation in water or in a concentrated sulfuric acid. Only dilute PEEK solutions can be formed in the concentrated sulfuric acid which adversely affects film forming characteristics, the mechanical characteristics, and the pore morphology of the porous PEEK membranes.

U.S. Pat. Nos. 4,992,485 and 5,089,192 disclose preparation of PEEK membranes from non-sulfonating acid solvents that include methane sulfonic acid and trifluoromethane sulfonic acid. European Patent Specification EP 0737506 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacturing of porous PEEK membranes disclosed in the art are highly corrosive, frequently toxic and generate substantial environmental and disposal problems. For these and other reasons, the acid based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent.

U.S. Pat. No. 5,200,078 discloses preparation of microporous PEEK membranes from its mixtures with plasticizers wherein the membrane undergoes a drawing step prior to or after the plasticizer is removed by leaching.

U.S. Pat. No. 5,227,101 issued to Dow Chemical Co. discloses preparation of microporous membranes from poly(aryl ether ketone) type polymer by forming a mixture of an unsulfonated PEEK type polymer, a low melting point crystallizable polymer, and a plasticizer, heating the resulting mixture, extruding or casting the mixture into a membrane, quenching or coagulating the membrane and leaching the pore forming components.

U.S. Pat. No. 5,205,968, issued to Dow Chemical Co., discloses preparation of microporous membranes from a blend containing a poly(aryl ether ketone) type polymer, an amorphous polymer and a solvent.

M. F. Sonnenschein in the article entitled "Hollow fiber microfiltration membranes from poly(ether ether ketone)", published in the Journal of Applied Polymer Science, Volume 72, pages 175–181, 1999, describes preparation of PEEK hollow fiber membranes by thermal phase inversion process. The use of a leachable additive polymer, such as polysulfone, is proposed to enhance membrane performance.

It is also known in the art to prepare porous PEEK membranes from its blends with a compatible poly(ether imide) polymer, PEI. Preparation of such membranes is described by R. S. Dubrow and M. F. Froix in U.S. Pat. No. 4,721,732 and by R. H. Mehta et al. in an article entitled "Microporous membranes based on poly(ether ether ketone) via thermally induced phase separation", published in the Journal of Membrane Science, Volume 107, pages 93–106, 1995. The porous structure of these PEEK membranes is formed by leaching the poly(ether imide) component with an appropriate strong solvent such as dimethylformamide.

However, as described by Mehta et al., the quantitative removal of PEI component by leaching is essentially impossible (i.e., Mehta et al. are unable to achieve substantially complete removal of PEI) which in turn can lead to an inferior membrane performance.

Japan Kokai Tokkyo Koho 91273038 assigned to Sumitomo Electric Industries, Ltd., discloses preparation of porous PEEK membranes by an ion track etching method.

A recent report by Y. Ding and B. Bikson entitled "Novel macro and meso porous materials prepared from polysulfone/polyimide blends" in "Material Research Society Symposium Proceeding", Volume 752, AAA1.3, Boston, 2002, describes preparation of porous polysulfone films from its blends with a phenylindane containing polyimide by decomposing the phenylindane containing polyimide with a hydrazine solution in methanol.

M. L. Bailey et al. in U.S. Pat. No. 5,651,931 describe a sintering process for the preparation of biocompatible filters, including PEEK filters. The filters are formed from a PEEK powder of a preselected average particle size by first pressing the powder into a "cake" followed by sintering in an oven or furnace. The process is limited to preparation of filters with a relatively large pore size and a broad pore size distribution and does not provide a economic means of forming large membrane area fluid separation devices.

Thus, as can be recognized from consideration of the prior art, when different polymers are intertwined, removal of one particular polymer so intertwined is extremely difficult in terms of substantial completeness (i.e., on the order of about 95% or greater) within the limited time frame necessary for efficient industrial manufacturing.

Thus there still remains a need in the art to produce porous PAEK articles, including porous membranes with improved properties, by a simple and commercially scalable process that is environmentally benign and does not utilize corrosive or toxic chemicals in membrane fabrication.

SUMMARY OF THE INVENTION

It is thus an objective of this invention to provide a simple, cost effective, and industrially feasible process for the preparation of porous PAEK articles and in particular PAEK membranes.

Another objective of this invention is to provide a porous PAEK article with an improved porous structure and uniform pore size distribution.

A further objective of this invention is to provide an improved fluid separation process that utilizes solvent and heat resistant PAEK membranes.

These and other objectives of this invention have been met by the process of preparing a porous PAEK article from a blend of PAEK with a compatible polyimide followed by the decomposition of the polyimide phase into easily removable low molecular weight fragments.

According to one embodiment of the present invention, the above objectives and other objectives that are apparent to those skilled in the art are achieved by a process of the preparation of a porous poly(aryl ether ketone) article comprising:

a. forming a blend of poly(aryl ether ketone) type polymer with a polyimide;

b. forming a shaped article from the blend by extrusion, casting or molding;

c. decomposing the polyimide in the shaped article into low molecular weight fragments by chemical means; and d. removing the low molecular weight fragments from the article.

The low molecular weight fragment removal step preferably takes place concurrently with the polyimide decomposition step in a common solvent system, i.e. the liquid media used to decompose the polyimide phase is also used to remove the low molecular weight fragments.

According to another embodiment of the present invention, the above objectives and other objectives that are apparent to those skilled in the art are achieved by a method for separating a fluid mixture into a fraction enriched in a first component and a fraction depleted in the first component, comprising the step of contacting said fluid mixture with a fluid separation membrane, the membrane having been formed by a process including the steps of:

a. forming a blend of poly(aryl ether ketone) type polymer with a polyimide;

b. forming a shaped article from said blend by extrusion, casting or molding;

c. decomposing said polyimide in said shaped article into low molecular weight fragments by chemical means;

d. removing said low molecular weight fragments from said article, whereby said fraction enriched in the first component and said fraction depleted in the first component are generated by preferentially permeating a portion of said fluid mixture through said fluid separation membrane.

DETAILED DESCRIPTION OF AN EMBODIMENT OF THE INVENTION

Figure 1:
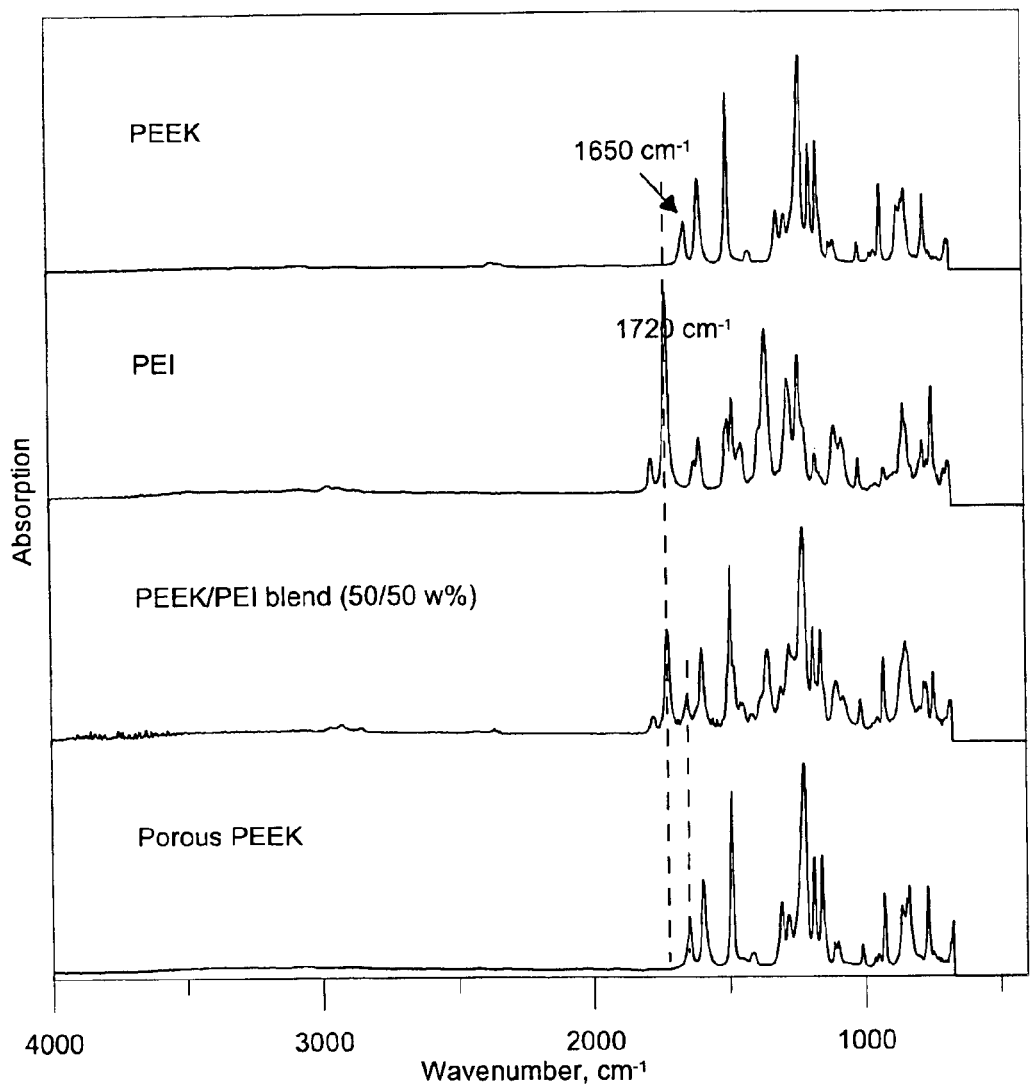
FIG. 1 is the FT-IR spectra of the poly(ether ether ketone), the poly(ether imide), the poly(ether ether ketone)/poly (ether imide) blend (50/50, by weight), and the porous poly(ether ether ketone) film of this invention.

The porous articles of this invention are comprised of poly(aryl ether ketone)s. These articles are prepared from a blend of a poly(aryl ether ketone) type polymer with a compatible polyimide. First a precursor article is formed from the poly(aryl ether ketone)/polyimide blend by extrusion, casting or molding followed by a selective chemical decomposition of the polyimide phase to form the final porous article.

The porous article is comprised of a poly(aryl ether ketone) or a blend of poly(aryl ether ketone)s of the following formula:

[—Ar'—CO—Ar"-]$_n$ wherein Ar' ad Ar" are aromatic moieties, wherein at least one aromatic moiety contains a diarylether or diarylthioether functional group which is a part of the polymer backbone, and wherein n is integer from 20 to 500.

Preferably, the poly(aryl ether ketone) is selected from the homopolymers of the following repeat units:

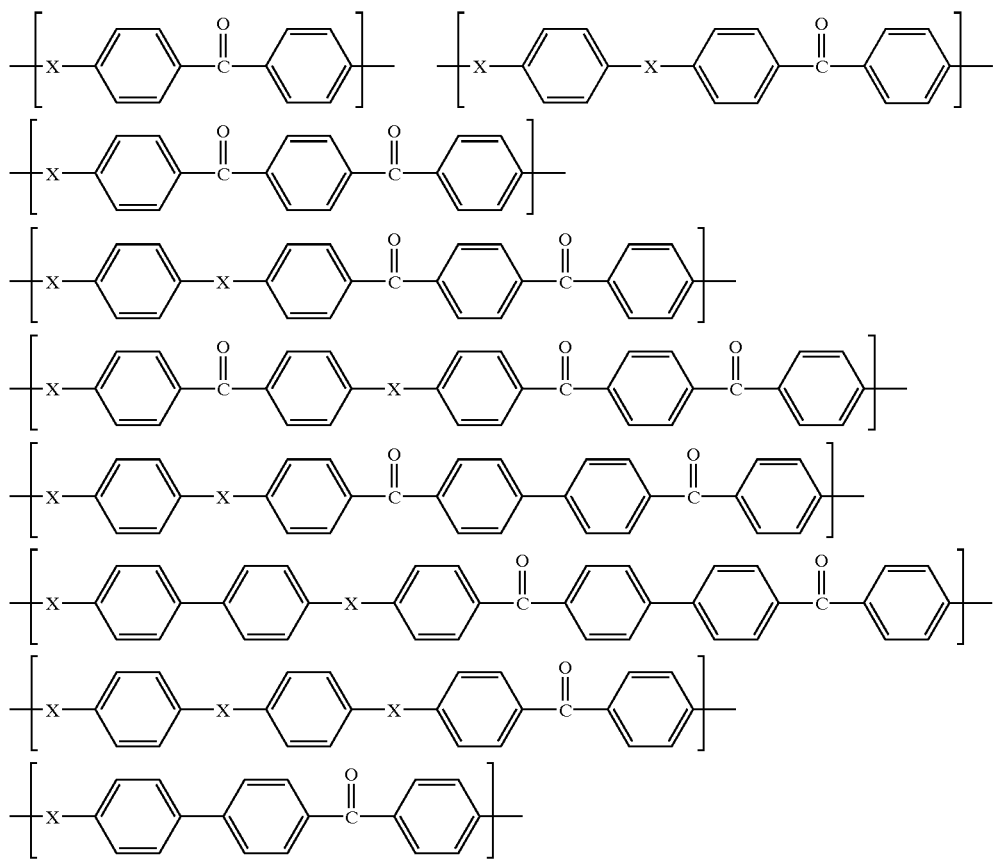

where X=O, S.

The preferred poly(aryl ether ketone)s of this invention are semi-crystalline, and are insoluble in organic solvents at room temperature. The most preferred poly(aryl ether ketone) of this invention is poly(ether ether ketone) (PEEK) and poly(ether ketone), both manufacture by Victrex Corporation under the trade name of Victrex®.

The polyimides that form the compatible precursor blend with the poly(aryl ether ketone) type polymers are defined as polymers containing

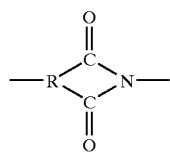

linkages and include aliphatic and aromatic polyimides, copolyimides and polyimide block and graft copolymers, wherein the polyimide is defined as a molecule that contains at least two imide linkages. Additional polyimides of the present invention include aromatic polyamide imides, polyhydrazine imides and polyester imides.

Aromatic polyimides are particularly useful for the preparation of porous articles of this invention. The preferred aromatic polyimides are described by the following general formula:

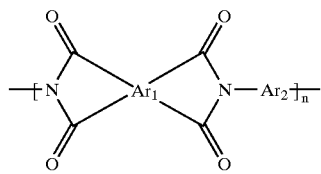

where n is an integer from 2 to 5,000, and where

is independently

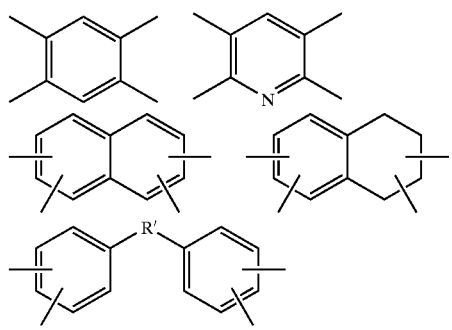

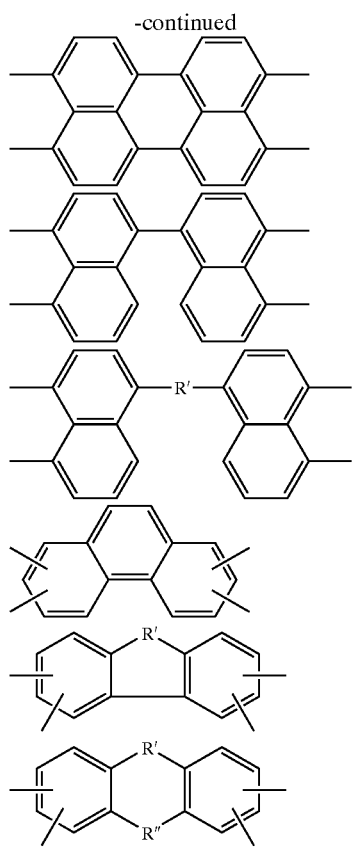
or mixtures thereof.
—R'— is
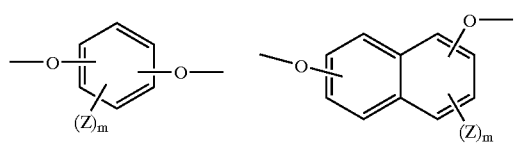
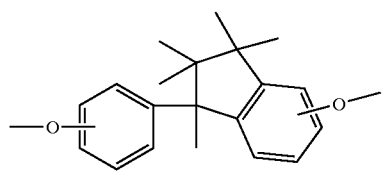
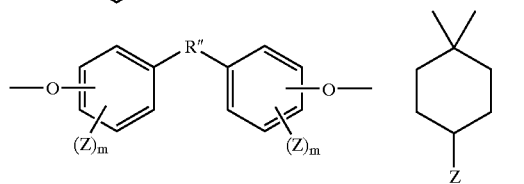
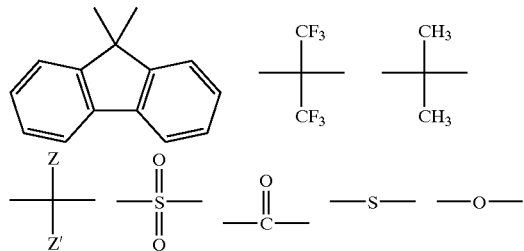
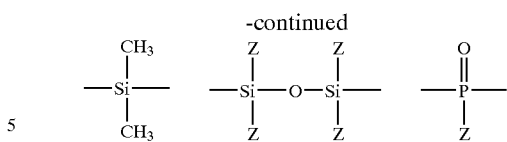
where m equals 0 to 4.
—R"— is
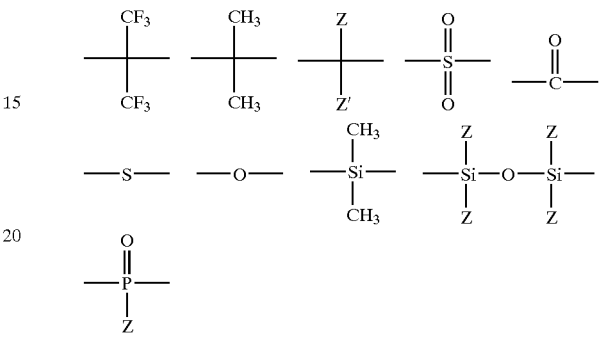
Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN
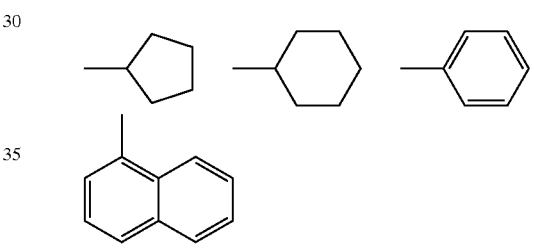
where —Ar$_2$— is independently
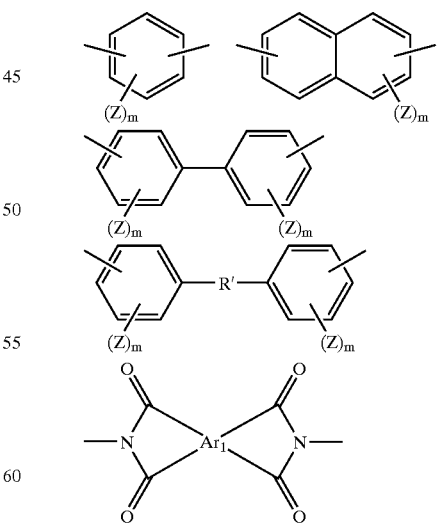
or mixtures thereof, where Ar$_1$ and m are defined as above.

—Ar₃— is

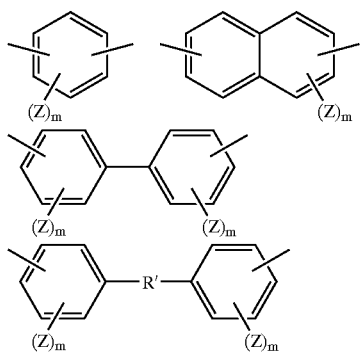

where m is defined above.

The most preferred polyimides are the poly(ether imide), PEI, of the following formula, manufactured by the General Electric Company under the trade name of Ultem®:

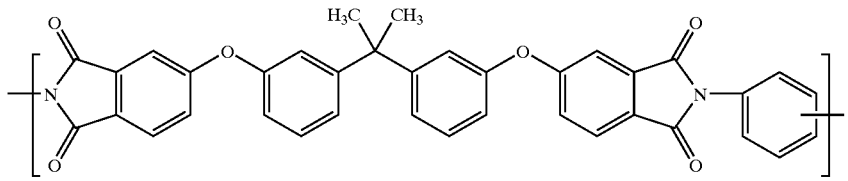

including copolymers and block copolymers of poly(ether imide), such as Ultem® XH1010F, Ultem®6050 and Siltem®STM 1500 manufactured by General Electric Corporation, and the phenylindane containing polyimide of the following formula manufacture by the Ciba Geigy Corp. under the trade name of Matrimid®:

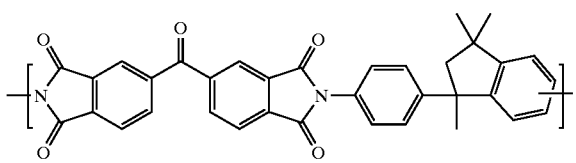

Additional preferred polyimide is the aromatic polyimide which is the polyimide formed from the reaction of benzophenone tetracarboxylic dianhydride (BTDA) and optionally pyromellitic dianhydride (PMDA), with toluene diisocyanate (TDI) and/or 4,4'-nethylene-bisphenylisocyanate (MDI). One example of such polyimide is the polyimide manufactured by the Lenzing Corporation under the trade name of Lenzing® P84 with the following generalized structure:

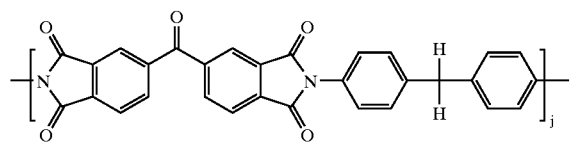

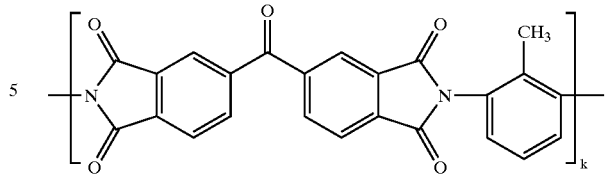

where j+k=1.

The polyimides can be used as a single additive component or as a mixture of polyimides. The polyimides typically have a weight average molecular weight in the range of 500 to 1,000,000 Daltons, preferably between 1,000 to 500,000 Daltons.

The formation of the poly(aryl ether ketone) blends with the polyimide can be carried out by mixing components in a molten stage, such as by melt compounding, and other methods conventionally employed in the polymer compounding industry. A plasticizer can be optionally added to aid the mixing process.

The formation of the poly(aryl ether ketone) polyimide blends can be also carried out by a solution process. If a solution process is employed, the component polymers can be dissolved in a high boiling solvent, such as diphenyl sulfone, benzophenone, tetramethylene sulfone, and the like, and then quenched into water or an alcohol based solvent. The thus formed poly(aryl ether ketone)/polyimide blends form compatible blend compositions. The compatible composition is defined as capable of forming porous poly(aryl ether) articles with inter-connected pore structure and an average pore diameter of a micrometer or less. Preferred compatible blends are alloys. The most preferred compatible blend is the PEEK/PEI blend.

Blends suitable for use in preparing porous articles in accordance with this invention comprise from about 5 to about 95 weight percent of the poly(aryl ether ketone) polymer component and from 95 to 5 weight percent of one or more polyimide component, preferably from about 20 to about 70 weight percent of the poly(aryl ether ketone) component.

The blends can contain various additives in addition to the compatible polyimide component, including solvents to reduce blend viscosity, stabilizers, flame retardants, pigments, fillers, such as catalytic particles, plasticizers, and the like. Other polymers can be also present in the blend to provide a desired additive property.

The poly(aryl ether ketone)/polyimide precursor blends can be fabricated into a flat sheet film, a fiber, a hollow fiber or other desired shape article by a melt extrusion, a casting or a molding process. The article configuration will depend on the intended use. The article can be optionally annealed at a temperature between 150 to 350° C., preferably between 200 to 300° C. to increase the crystallinity prior to the removal of the polyimide phase.

The decomposition of the polyimide component of the blend can be effectively carried out by reagents that decompose the polyimide into low molecular weight easily extractable fragments. The preferred classes of reagents include but are not limited to ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent. Examples of suitable solvents include alcohols, ketones, hydrocarbons, water, and aprotic solvents such as NMP, DMF, and the like. Reagents suitable to decompose the polyimide phase in accordance with this invention include, but are not limited to, ammonia, tetramethylammonium hydroxide, hydrazine, methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred amines include hydrazine, monoethanolamine, tetramethylammonium hydroxide, and their mixtures with alcohols, such as methanol, ethanol, isopropanol, or butanol, ketones, water, and aprotic solvents. The most preferred reagents for the decomposition of the polyimide phase are the monoethanolamine and the tetramethylammonium hydroxide. It was found surprisingly that the monoethanolamine and its mixtures with alcohols and aprotic solvents and the tetramethylammonium hydroxide and its mixtures with alcohols and aprotic solvents are particularly effective in decomposing and rapidly removing the polyimide phase. The decomposition and the removal of the polyimide component can be carried out at an ambient temperature or at elevated temperatures to facilitate the decomposition process and the removal of decomposition products. The polyimide decomposition can be carried out in a broad range of temperatures from the room temperature to about 180° C., or even higher. Preferably the polyimide decomposition process and the removal of the low molecular weight decomposition product are carried out concurrently in a common solvent media. In one embodiment of this invention, the polyimide decomposition and removal process is carried out at between 20° C. and 180° C., preferably between 40 and 140° C. The time required to fully decompose polyimide and to remove products of the decomposition process from the article will depend on the shape and the thickness of the article and on process conditions, such as reagent concentration, agitation rate, temperature and the like, as will be recognized by those skilled in the art. The porous poly(aryl ether ketone) articles are then washed with an alcohol, water, or other suitable solvent, dried and fabricated into a device.

In some embodiments, it is desirable to perform the final drying step from a low surface tension solvent, such a hydrocarbon, or a fluorocarbon. It is known in the art that drying a porous article from such low surface tension solvent can preserve the porous structure. Preferred hydrocarbons include pentane, hexane, cyclohexane heptane, octane, and mixtures thereof. Preferred fluorocarbon solvents include chlorofluorocarbons, for example, Freon 113® chloroflurocarbon, and perfluorocarbons, for example, Fluorinert 75®. The porous articles can be dried in air or in an inert gas such as nitrogen. Drying may be also carried out under vacuum. The articles may be dried at temperatures at which drying takes place at a reasonable rate and which do not adversely affect the porous structure. The drying temperatures can be between about 0° C. and about 200° C., preferably between 40° C. and 100° C. The drying time can be as short as about 30 seconds in a continuous drying operation and as long as 24 hours or longer in an enclosed oven. The thus formed porous articles can also be optionally annealed at a temperature between 150 and 350° C., preferably between 200 to 300° C. to increase the crystallinity. In some embodiments, the annealing can be carried out by immersing the porous poly(aryl ether ketone) article into a liquid media, such as glycerin maintained at a desired elevated temperature. This annealing step can be carried out in lieu or in addition to the annealing of the poly(aryl ether ketone)/polyimide blend article prior to leaching.

The porous PAEK articles of this invention are characterized by a narrow pore size distribution and frequently exhibit small average pore sizes. The average pore diameter can be below 1 micrometer, and frequently is below 0.25 micrometer. The average pore diameter is affected by polyimide selection, by blend processing conditions and by PAEK/polyimide blend ration. Low PAEK/polyimide ratio favors formation of porous materials with increased balk porosity and increased pore diameter. The use of polyimides with improved PAEK compatibility, such as poly(ether imide), favors formation of porous materials with smaller diameter pores. For example, the porous PEEK material formed from 50/50 PEEK/PEI blend exhibits pore diameter in the range of 0.012 micrometer.

The porous PAEK articles are further characterized by a high specific surface area. The specific surface area can be above 20 m$^2$/g, and preferably is above 100 m$^2$/g.

In some embodiments of this invention, it is desirable to draw the poly(aryl ether ketone) article to affect the shape and the size of pores and to improve mechanic properties. The membrane articles are drawn to improve permeability, separation efficiency or mechanical properties. The drawing can be performed on the poly(aryl ether ketone)/polyimide blend precursor prior to the removal of the polyimide phase or on the porous poly(aryl ether ketone) article after the polyimide phase has been decomposed and removed, or both. Further more, the drawing step can be carried out prior or after the drying step. In some embodiments, the porous structure can be impregnated with a liquid processing aid, such as glycerin, prior to drawing. The articles are drawn by stretching the films, the fiber, or the hollow fiber under tension. Conventional equipments, such as godets, are utilized to draw the articles. The articles are drawn to a ratio of between 1.1 to about 10 or more. The draw ratio is defined as the ratio of the final length after drawing to the original length before drawing:

$L_f/L_i$, where $L_f$ is the final length after drawing and $L_i$ is the initial length before drawing.

The preferred drawing temperature is dependent upon whether the article contains plasticizers or other processing aids at the time of drawing. For poly(aryl ether ketone)/polyimide blend precursor article, it can further depend on the molecular weight of the polyimide and its concentration, as will be recognized by those skilled in the art. For articles substantially free of plasticizer, the drawing temperature is above the glass transition temperature and frequently below the melting point of the poly(aryl ether ketone) polymer. The drawing temperature is preferably between 140° C. and 360° C., most preferably between 160° C. to about 330° C. For articles that contain plasticizers, the drawing temperature can be substantially lower and will depend on the nature and the concentration of the plasticizer as will be recognized by those skilled in the art.

The line speeds for conducting the drawing step may vary significantly. Preferred line speeds range from about 1 meter per minute to about 200 meters per minute, particularly preferred line speeds range from 5 meter per minute to 50 meter per minute.

The porous articles of this invention can be in the form of a flat sheet film, a fiber, a tube, a hollow fiber, or any other desirable shape. The porous articles of this invention can be used as an adsorption media, as a separator in a device, such as a battery separator, or as a fluid separation membrane. The membrane articles can be in the form of a flat sheet, in a tubular form, or a hollow fiber configuration. In the case of hollow fibers, the fiber preferably possess an outside diameter from about 50 to about 5,000 micrometers, more preferably from about 80 to about 1,000 micrometers, with a wall thickness from about 10 to about 1,000 micrometers, preferably from 20 to 500 micrometers. In the case of films, the film preferably possess a thickness of from about 10 to about 1,000 micrometers, most preferably from about 25 to about 500 micrometers. The films may be optionally supported by a permeable cloth or a screen.

The porous poly(aryl ether ketone) membranes of this invention can be used directly for a number of fluid separation processes, such as microfiltration, ultrafiltration, nano-filtration and gas separation. The fluid separation method typically involves contacting a feed fluid with the poly(aryl ether ketone) membrane of this invention under conditions that sustain a pressure differential across the PEAK membrane. At least a fraction of the feed mixture permeates through the PEAK membrane. In the process of permeation the permeate fraction of the feed mixture is depleted in a component and the non-permeate fraction of the feed mixture is enriched in this component. The component or components can be in the form of a solute dissolved in the feed fluid, a solid matter suspended in the feed fluid, or a gaseous component being a part of the feed gas mixture. Further more, the fluid separation method can be a cross flow filtration process or a dead-end filtration process.

The porous poly(aryl ether ketone)s can be further used as substrates in preparation of composite fluid separation membranes. Such composite membranes consist of a porous or a nonporous separation layer superimposed or formed directly on the porous poly(aryl ether ketone) substrate. The separation layer can be formed by a direct casting process, by an interfacial polymerization process or other processes well known in the art.

It is also within the scope of present invention to form multilayer porous PAEK articles or PAEK articles with multiple porous zones. The multizone porous articles that contain porous zones that differ at least by about 10% in the average pore size or by at least about 5% in the pore volume are known to impart certain advantages to material mechanical or separation characteristics. For example, the multizone porous membranes are known to provide improved mechanical properties particularly in fluid separation applications that require periodic back washing, to exhibit a lower cross membrane pressure drop, a decreased susceptibility to breach in membrane separation layer and a decreased propensity to fouling. The multizone porous articles are formed from two or more PAEK/polyimide blends that differ in blend chemical composition. The blends can contain different PAEK and polyimide polymer components. Preferably, the chemical composition of individual blends differs in the PAEK/polyimide ratio. The PAEK polymers content of the first blend can differ from the PAEK polymer content of the second and any additional blend by at least 1 weight percent, preferably by at lease 5 weight percent, more preferably by at least 10 weight percent.

The multilayer flat sheet PAEK articles or multilayer PAEK articles of the tubular configuration can contain two, three or more contiguous layers that differ in the average pore size and/or pore volume. Furthermore, the individual layer can vary from about 1% of the overall article thickness or less to about 99% of the article thickness or more, typically from 10% to 90% of the article thickness. The layer comprised of the smaller average size pores can be about 1 micrometer thick or less to about 100 micrometers thick or more and is supported by or sandwiched between layers with a substantially larger average pore size.

The following examples will serve to illustrate the utility of this invention but should not be construed as limiting.

EXAMPLE 1

50 g of poly(aryl ether ketone) (Victrex®), 50 g of poly(ether imide) (Ultem®) and 500 g of tetramethylene sulfone were charged into a 3 L reaction kettle equipped with a nitrogen inlet and a mechanical stirrer. The mixture was heated to 290° C. and a homogeneous, transparent, amber colored solution was formed. The mixture was then poured into a large amounts of water to precipitate the blend of polymers. The solidified polymer blend powder was further washed with 4 L of methanol and dried under vacuum at 150° C. for 24 hour.

A PEEK/PEI (50:50, by weight) film was obtained by compression molding of the aforementioned blend powder at ca. 350° C. followed by slowly cooling the film to room temperature.

Figure 2:
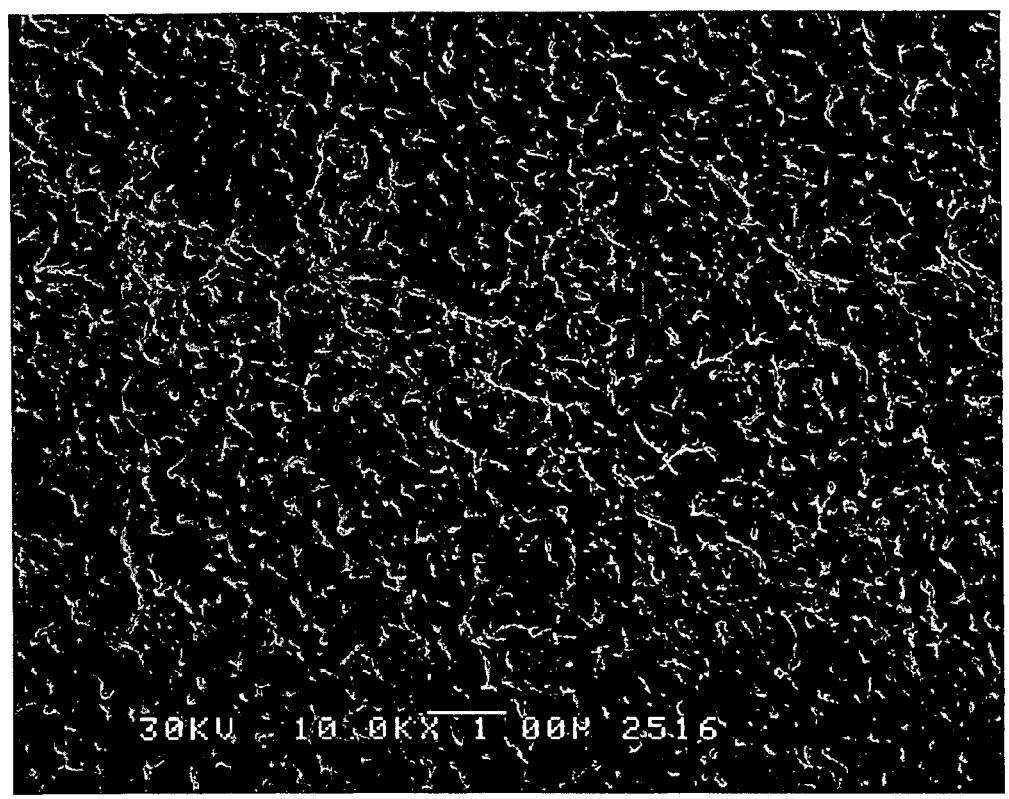
FIG. 2 is the Scanning Electron Microscopy photomicrograph of the cross-section of the porous poly(ether ether ketone) membrane of present invention prepared from the poly(ether ether ketone)/poly(ether imide) blend (50/50, by weight) at a magnification of 10,000×showing the uniform and highly interconnected porous structure.

A porous PEEK membrane was obtained by treating the PEEK/PEI film in monoethanolamine maintained at 80° C. for 8 hours. The film became opaque after the PEI component was removed. The porous film was then washed with methanol, and dried under vacuum at 50° C. overnight. The thickness of the porous film was 78 micrometers. The weight loss of the PEEK/PEI blend film was 50%, indicating that the PEI phase had been quantitatively removed. ATR-FTIR spectra confirmed the quantitative removal of the PEI component (FIG. 1). The 1720 cm$^{-1}$ peak assigned to C=O group in the imide linkage is completely absent from the FT-IR spectrum of the porous PEEK film. The SEM microphotograph of the PEEK membrane cross section is shown in FIG. 2. The microphotograph indicates that the membrane is highly porous and possesses a uniform pore size distribution. The pores are worm-like and interconnected. The gas transport properties of the porous PEEK membrane are summarized in Table 1. The ideal gas separation factor for the gas pair of $O_2$ and $N_2$ was determined to be 0.97 and the ideal gas separation factor for the gas pair of He and $N_2$ was determined to be 2.5.

TABLE 1

| Gas transport properties of porous PEEK membrane | |
|---|---|
| Pure gas | Permeance (GPU)* |
| $O_2$ | 7150 |
| $N_2$ | 7380 |
| He | 18500 |

*1 GPU = 1 × 10$^{-6}$ cm$^3$ (STP)/cm$^2$ · s · cmHg.

EXAMPLE 2

30 g of poly(aryl ether ketone) (Victrex®), 70 g of poly(ether imide) (Ultem®) and 500 g of tetramethylene sulfone were charged into a 3 L reaction kettle equipped with a nitrogen inlet and a mechanical stirrer. The mixture was heated to 290° C. and a homogeneous, transparent, amber colored solution was formed. The mixture was then poured into a large amounts of water to precipitate the blend of polymers. The solidified polymer blend powder was further washed with 4 L of methanol and dried under vacuum at 150° C. for 24 hours.

A PEEK/PEI (30:70, by weight) film was obtained by compression molding of the aforementioned blend powder at ca. 350° C. followed by slowly cooling the film to room temperature.

Figure 3:
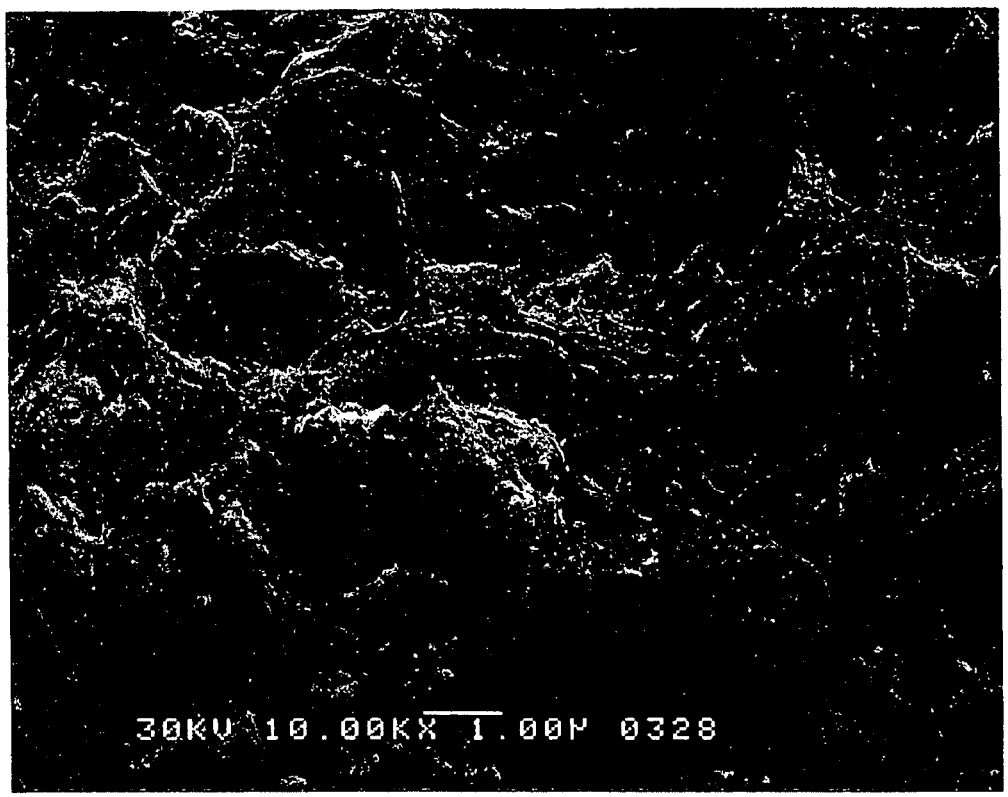
FIG. 3 is the Scanning Electron Microscopy photomicrograph of the cross-section of the porous poly(ether ether ketone) membrane of present invention prepared from the poly(ether ether ketone)/poly(ether imide) blend (30/70, by weight) at a magnification of 10,000×showing interconnected worm-like porous structure.

A porous PEEK membrane was obtained by treating the PEEK/PEI film with the monoethanolamine maintained at 80° C. for 8 hours. The film became opaque after the PEI component was removed. The porous film was then washed with methanol, and dried under vacuum at 50° C. overnight. The thickness of the porous film was 78 micrometers. The weight loss of the PEEK/PEI blend film was 70%, indicating that the PEI phase had been quantitatively removed. The SEM microphotograph of the PEEK film cross section is shown in FIG. 3. The microphotograph indicates that the membrane is highly porous. The pores are worm-like and interconnected.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A process for the preparation of a porous poly(aryl ether ketone) article comprising the steps of:
   a. forming a blend of poly(aryl ether ketone) polymer with a polyimide,
   b. forming a shaped article from said blend by extrusion, casting or molding,
   c. decomposing said polyimide in said shaped article into low molecular weight fragments by chemical means by contacting the shaped article with ammonia, tetraalkylammonium hydroxide, primary aliphatic amine, secondary aliphatic amine, or a mixture thereof,
   d. removing said low molecular weight fragments from said article.

2. The process of claim 1 wherein said shaped article is subjected to annealing prior to step c).

3. The process of claim 1 wherein said steps c) and d) take place concurrently in a common liquid media.

4. The process of claim 1 further comprising drying the porous article under conditions that substantially preserves the porous structure.

5. The process of claim 4 wherein said drying process is carried out from a hydrocarbon or a fluorocarbon solvent.

6. The process of claim 5 wherein said hydrocarbon is pentane, hexane, cyclohexane, heptane, octane or a mixture thereof, and said flouorocarbon is a chlorofluorocarbon or a perfluorocarbon.

7. The process of claim 2 wherein said poly(aryl ether ketone) is poly(ether ether ketone) or poly(ether ketone).

8. The process of claim 7 wherein polyimide in said poly(aryl ether ketone)/polyimide blend is poly(ether imide) of the following repeat unit:

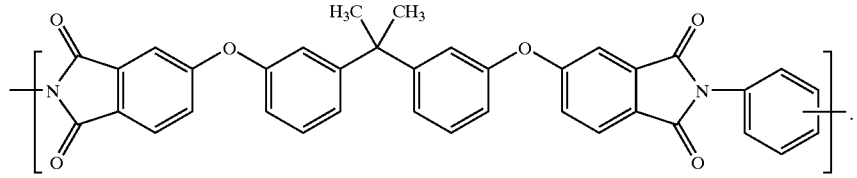

9. The process of claim 8 wherein said poly(ether imide) has a molecular weight between 1,000 and 500,000.

10. The process of claim 8 wherein said poly(ether ether ketone) or poly(ether ketone) comprises from 5 to 95 weight percent of said blend.

11. The process of claim 10 wherein said poly(ether ether ketone) or poly(ether ketone) comprises from 20 to 80 weight percent of said blend.

12. The process of claim 7 wherein polyimide in said poly(aryl ether ketone)/polyimide blend is the phenylindane containing polyimide of the following repeat unit:

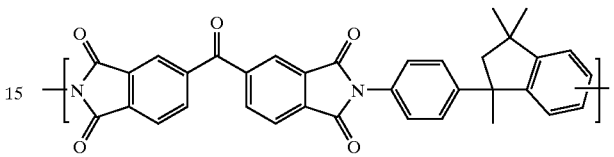

13. The process of claim 12 wherein said phenylindane containing polyimide has a molecular weight between 1,000 and 500,000.

14. The process of claim 13 wherein said poly(ether ether ketone) or poly(ether ketone) comprises from 20 to 80 weight percent of said blend.

15. The process of claim 2 wherein said porous article is a flat sheet, a fiber, a tube, or a hollow fiber.

16. The process of claim 1 wherein said tetraalkyammonium hydroxide is tetramethylammonium hydroxide.

17. The process of claim 1 wherein said primary aliphatic amine is monoethanolamine, ethylamine, propylamine, butylamine, or a mixture thereof.

18. The process of claim 1 wherein said ammonia, tetraalkylammonium hydroxide, primary aliphatic amine, secondary aliphatic amine are in a solution of alcohol, hydrocarbon, ketone, water, aprotic solvent or a mixture thereof.

19. The process of claim 2 wherein said annealing step is carried out at a temperature between 200° C. and 300° C.

20. The process of claim 15 wherein said flat sheet, said fiber, said tube, or said hollow fiber is drawn prior to step c), after step d) or both.

21. The process of claim 15 wherein said flat sheet, said tube, or said hollow fiber is a fluid separation membrane.

22. The process of claim 15 wherein said article is a battery separator.

23. The process of claim 1 wherein said shaped poly(aryl ether ketone) article is a multilayer article formed from two or more poly(aryl ether ketone) polymer polyimide blends that differ in blend chemical composition.

24. The process of claim 23 wherein the poly(aryl ether ketone) polymer weight content in said blends differ by at least 1 percent.

25. The process of claim 23 wherein said shaped article is annealed prior to step c).

26. The process of claim 1 wherein said blend of poly(aryl ether ketone) with polyimide contains an additive.

27. The process of claim 26 wherein said additive is a solvent, a plasticizer, or a filler.

28. The process of claim 1 wherein the specific surface area of said article is above 20 $m^2/g$.

29. The process of claim 28 wherein said polyimide is decomposed by contacting the shaped article with a primary aliphatic amine.

30. The process of claim 29 wherein said primary aliphatic amine is in a solution of alcohol, hydrocarbon, ketone, water, aprotic solvent or a mixture thereof.

* * * * *